US012302945B2

(12) United States Patent
Rogan

(10) Patent No.: US 12,302,945 B2
(45) Date of Patent: May 20, 2025

(54) INHALATION SYSTEM AND A VAPOUR GENERATING ARTICLE

(71) Applicant: JT International S.A., Geneva (CH)

(72) Inventor: Andrew Robert John Rogan, Forres (GB)

(73) Assignee: JT International SA (CH)

( * ) Notice: Subject to any disclaimer, the term of this patent is extended or adjusted under 35 U.S.C. 154(b) by 1079 days.

(21) Appl. No.: 17/274,298

(22) PCT Filed: Oct. 17, 2019

(86) PCT No.: PCT/EP2019/078182
§ 371 (c)(1),
(2) Date: Mar. 8, 2021

(87) PCT Pub. No.: WO2020/079130
PCT Pub. Date: Apr. 23, 2020

(65) Prior Publication Data

US 2021/0337874 A1 Nov. 4, 2021

(30) Foreign Application Priority Data

Oct. 18, 2018 (EP) .................................... 18201125

(51) Int. Cl.
*A24F 40/465* (2020.01)
*H05B 6/10* (2006.01)

(52) U.S. Cl.
CPC ........... *A24F 40/465* (2020.01); *H05B 6/108* (2013.01)

(58) Field of Classification Search
CPC ........ A24F 40/465; A24F 40/20; A24F 40/50; H05B 6/108; H05B 6/02; A24D 1/20; A24D 1/006; A24D 1/02; A24D 1/045
See application file for complete search history.

(56) References Cited

U.S. PATENT DOCUMENTS 5,692,526 A 12/1997 Adams et al.
2014/0366898 A1 12/2014 Monsees et al.
(Continued)

FOREIGN PATENT DOCUMENTS

CN 1190335 A 8/1998
CN 105263346 A 1/2016
(Continued)

OTHER PUBLICATIONS

Search Report dated Jul. 14, 2022 from Office Action for Chinese Application No. 201980066676.1 issued Jul. 25, 2022. 3 pgs.
(Continued)

*Primary Examiner* — Travis S Chambers
(74) *Attorney, Agent, or Firm* — Lerner David LLP

(57) ABSTRACT

An inhalation system for generating a vapour for inhalation by a user includes an inhalation device including a controller and a vapour generating article including a vapour generating material and a heating element. The vapour generating article has first and second regions. The second region contains one or more of a higher density of the vapour generating material than the first region, vapour generating material with a higher moisture content than the first region, or vapour generating material with a higher aerosol-former content than the first region, and the heating element is arranged to generate more heat in the second region than in the first region.

12 Claims, 5 Drawing Sheets

(56) References Cited

U.S. PATENT DOCUMENTS

| | | | | |
|---|---|---|---|---|
| 2016/0295921 | A1 | 10/2016 | Mironov et al. | |
| 2017/0055582 | A1 | 3/2017 | Blandino et al. | |
| 2017/0340015 | A1* | 11/2017 | Thorens | A24F 40/44 |
| 2019/0008210 | A1 | 1/2019 | Mironov et al. | |
| 2019/0387787 | A1* | 12/2019 | Hejazi | A24D 1/20 |
| 2021/0145062 | A1* | 5/2021 | Courbat | H05B 6/44 |
| 2021/0161208 | A1* | 6/2021 | Mironov | A24D 1/20 |
| 2021/0227875 | A1* | 7/2021 | Zhurba | H05B 6/105 |
| 2021/0378311 | A1* | 12/2021 | Courbat | H05B 6/108 |

FOREIGN PATENT DOCUMENTS

| | | | |
|---|---|---|---|
| CN | 105407750 | A | 3/2016 |
| CN | 107920597 | A | 4/2018 |
| JP | H10170751 | A | 6/1998 |
| JP | 2016525341 | A | 8/2016 |
| WO | 9632854 | A2 | 10/1996 |
| WO | 2015177294 | A1 | 11/2015 |
| WO | 2017001819 | A1 | 1/2017 |
| WO | 2017036954 | A1 | 3/2017 |
| WO | 2017072147 | A2 | 5/2017 |
| WO | 2018002084 | A1 | 1/2018 |

OTHER PUBLICATIONS

International Search Report for Application No. PCT/EP2019/078182, dated Jan. 24, 2020, 5 pages.

* cited by examiner

INHALATION SYSTEM AND A VAPOUR GENERATING ARTICLE

CROSS-REFERENCE TO RELATED APPLICATIONS

The present application is a national phase entry under 35 U.S.C. § 371 of International Application No. PCT/EP2019/078182, filed Oct. 17, 2019, published in English, which claims priority to European Application No. 18201125.4 filed Oct. 18, 2018, the disclosures of which are incorporated herein by reference.

TECHNICAL FIELD

The present disclosure relates to an inhalation system for generating a vapour for inhalation by a user. Embodiments of the present disclosure also relate to a vapour generating article which, when heated, generates a vapour or aerosol for inhalation by a user.

TECHNICAL BACKGROUND

Devices which heat, rather than burn, a vapour generating material to produce a vapour or aerosol for inhalation have become popular with consumers in recent years. Such devices can use one of a number of different approaches to provide heat to the vapour generating material.

One approach is to provide an inhalation device which employs a resistive heating system. In such a device, a resistive heating element is provided to heat the vapour generating material and a vapour or aerosol is generated as the vapour generating material is heated by heat transferred from the heating element.

Another approach is to provide an inhalation device which employs an induction heating system. In such a device, an induction coil is provided with the device and a susceptor is provided typically with the vapour generating material. Electrical energy is provided to the induction coil when a user activates the device which in turn generates an alternating electromagnetic field. The susceptor couples with the electromagnetic field and generates heat which is transferred, for example by conduction, to the vapour generating material and a vapour or aerosol is generated as the vapour generating material is heated.

Whichever approach is used to heat the vapour generating material, it can be convenient to provide the vapour generating material in the form of a vapour generating article which can be inserted by a user into the inhalation device. Embodiments of the present disclosure seek to provide an improved user experience in which the characteristics of the vapour are optimised.

SUMMARY OF THE DISCLOSURE

According to a first aspect of the present disclosure, there is provided an inhalation system for generating a vapour for inhalation by a user, the inhalation system comprising:

an inhalation device including a controller; and a vapour generating article comprising a vapour generating material and a heating element;

wherein the vapour generating article has first and second regions, the second region contains one or more of a higher density of the vapour generating material than the first region, vapour generating material with a higher moisture content than the first region, or vapour generating material with a higher aerosol-former content than the first region, and the heating element is arranged to generate more heat in the second region than in the first region.

According to a second aspect of the present disclosure, there is provided a vapour generating article comprising a vapour generating material and a heating element, wherein the vapour generating article has first and second regions, the second region contains one or more of a higher density of the vapour generating material than the first region, vapour generating material with a higher moisture content than the first region, or vapour generating material with a higher aerosol-former content than the first region, and the heating element is arranged to generate more heat in the second region than in the first region.

The inhalation system is adapted to heat the vapour generating material, without burning the vapour generating material, to volatise at least one component of the vapour generating material and thereby generate a vapour or aerosol for inhalation by a user of the inhalation system.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

Embodiments of the present disclosure provide for selective (or "zonal") heating of the vapour generating material by generating more heat in the region containing the highest density of the vapour generating material and/or vapour generating material with the highest moisture content and/or vapour generating material with the highest aerosol former content (i.e., the second region). Selectively heating the vapour generating material in this way can help to maintain consistency in the release of vapour or aerosol from the vapour generating material and to ensure that a vapour or an aerosol with optimum characteristics is generated during use of the inhalation system.

The vapour generating article may comprise a wrapper surrounding the vapour generating material and may be generally rod-shaped with first and second ends. A filter may be positioned at the first end and the second region may be positioned at the second end. By positioning the second region, which in some embodiments may have the higher density of vapour generating material, at the second end, the lower density of the vapour generating material in the first region can be retained more reliably inside the wrapper. The wrapper may comprise a material which is non-electrically conductive and non-magnetically permeable. The wrapper may, for example, comprise a paper wrapper.

In some embodiments, the heating element may comprise a resistive heating element. Thus, the vapour generating article may comprise a vapour generating material and a resistive heating element. The resistive heating element may comprise a metal wire.

In some embodiments, the heating element may comprise an inductively heatable susceptor. Thus, the vapour generating article may comprise a vapour generating material and an inductively heatable susceptor.

The inductively heatable susceptor may comprise a plurality of susceptor elements of the same type and the second region may contain a higher density of the susceptor elements than the first region. The construction of the vapour generating article may be simplified due to the use of susceptor elements of the same type in the first and second regions.

The inductively heatable susceptor may comprise a first type of susceptor element and a second type of susceptor element. The first type of susceptor element may be provided in the first region and the second type of susceptor element may be provided in the second region. The use of first and second types of susceptor element may facilitate construction of the vapour generating article by enabling more heat to be generated in the second region without the need to control the density of the susceptor elements provided in the first and second regions. The first and second types of susceptor element may comprise respectively first and second susceptor materials.

In one embodiment, the second type of susceptor element may generate more heat per unit time than the first type of susceptor element when the first and second types of susceptor element are exposed, in use, to the same electromagnetic field. In this embodiment, the first and second regions can be heated simultaneously with the second region being heated by more heat input than the first region.

In another embodiment, the second type of susceptor element may generate heat for a longer period of time than the first type of susceptor element when the first and second types of susceptor element are exposed, in use, to the same electromagnetic field. In this embodiment, heating of the second region can continue after heating of the first region has ceased.

In a further embodiment, the first type of susceptor element may be arranged to be broken to thereby break its electrical path before the second type of susceptor element when the first and second types of susceptor element are exposed, in use, to the same electromagnetic field. In this embodiment, heating of the second region can continue after heating of the first region has ceased.

The first type of susceptor element may have a weakened part which may have a higher electrical resistance than the other parts of the first type of susceptor element. In one embodiment, the second type of susceptor element may have a weakened part having a higher electrical resistance than the other parts of the second type of susceptor element and the weakened part of the second type of susceptor element may be stronger than the weakened part of the first type of susceptor element. In an alternative embodiment, the second type of susceptor element may not have a weakened part.

With this arrangement, the first and second types of susceptor element can be selected to ensure that after heating of the first region ceases through breakage of the electrical path of the first type of susceptor element resulting from failure of the weakened part, heating in the second region can continue.

The weakened part may have a smaller cross-sectional area than other parts of the susceptor element(s). The weakened part may have a smaller cross-sectional area than other parts of the susceptor element(s) in a plane perpendicular to a direction of current flow through the susceptor element(s). The weakened part of the first and optionally second types of susceptor element(s) can be easily created by a simple reduction in the cross-sectional area of the susceptor element(s) and the level of weakness can be easily controlled by appropriate selection of the cross-sectional area thereby allowing heat generation within the vapour generating article to be optimised.

The inductively heatable susceptor may comprise a ring-shaped susceptor. The inductively heatable susceptor may include a non-concentric aperture. The inductively heatable susceptor may include a slit. The non-concentric aperture or slit provides a reduced cross-sectional area and, thus, acts as the weakened part of the susceptor element(s). The weakened part can, therefore, be easily created and the level of weakness can be easily controlled thereby allowing heat generation within the vapour generating article to be optimised.

The vapour generating article may have a longitudinal direction and the first and second regions may be arranged along the longitudinal direction. Such an arrangement may facilitate fabrication of the vapour generating article, for example using conventional machinery and/or assembly lines.

The vapour generating article may have an axis and the first and second regions may be arranged along a radial direction with respect to the axis. Such an arrangement may also facilitate fabrication of the vapour generating article.

The inductively heatable susceptor may comprise one or more, but not limited, of aluminium, iron, nickel, stainless steel and alloys thereof, e.g. Nickel Chromium or Nickel Copper. With the application of an electromagnetic field in its vicinity, the susceptor may generate heat due to eddy currents and magnetic hysteresis losses resulting in a conversion of energy from electromagnetic to heat.

The inhalation device may comprise an induction coil arranged to generate an electromagnetic field. The inductively heatable susceptor is inductively heatable in the presence of the electromagnetic field.

The induction coil may comprise a Litz wire or a Litz cable. It will, however, be understood that other materials could be used. The induction coil may be substantially helical in shape and may, for example, extend around a space in which the vapour generating article is received in use.

The circular cross-section of a helical induction coil may facilitate the insertion of the vapour generating article into the inhalation device, for example into the space in which the vapour generating article is received in use, and may ensure uniform heating of the vapour generating material.

The induction coil may be arranged to operate in use with a fluctuating electromagnetic field having a magnetic flux density of between approximately 20 mT and approximately 2.0 T at the point of highest concentration.

The inhalation device may include a power source and circuitry which may be configured to operate at a high frequency. The power source and circuitry may be configured to operate at a frequency of between approximately 80 kHz and 500 kHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

The vapour generating material may be any type of solid or semi-solid material. Example types of vapour generating solids include powder, granules, pellets, shreds, strands, particles, gel, strips, loose leaves, cut filler, porous material, foam material or sheets. The vapour generating material may comprise plant derived material and in particular, may comprise tobacco.

The foam material may comprise a plurality of fine particles (e.g. tobacco particles) and can also comprise a volume of water and/or a moisture additive, such as a humectant. The foam material may be porous, and may allow a flow of air and/or vapour through the foam material.

As noted above, the vapour generating material may comprise an aerosol-former. Examples of aerosol-formers include polyhydric alcohols and mixtures thereof such as glycerine or propylene glycol. Typically, the vapour generating material may comprise an aerosol-former content of between approximately 5% and approximately 50% on a dry weight basis. In some embodiments, the vapour generating material may comprise an aerosol-former content of between approximately 10% and approximately 20% on a dry weight basis, and possibly approximately 15% on a dry weight basis. As also noted above, in some embodiments the vapour generating material in the second region contains a higher aerosol-former content than the vapour generating material in the first region.

Upon heating, the vapour generating material may release volatile compounds. The volatile compounds may include nicotine or flavour compounds such as tobacco flavouring.

The vapour generating article may comprise an air-permeable shell containing the vapour generating material. The air permeable shell may comprise an air permeable material which is non-electrically conductive and non-magnetically permeable. The material may have a high air permeability to allow air to flow through the material with a resistance to high temperatures. Examples of suitable air permeable materials include cellulose fibres, paper, cotton and silk. The air permeable material may also act as a filter. Alternatively, the vapour generating material may be contained inside a material that is not air permeable, but which comprises appropriate perforations or openings to allow air flow.

DETAILED DESCRIPTION OF EMBODIMENTS

Embodiments of the present disclosure will now be described by way of example only and with reference to the accompanying drawings.

Figure 1:
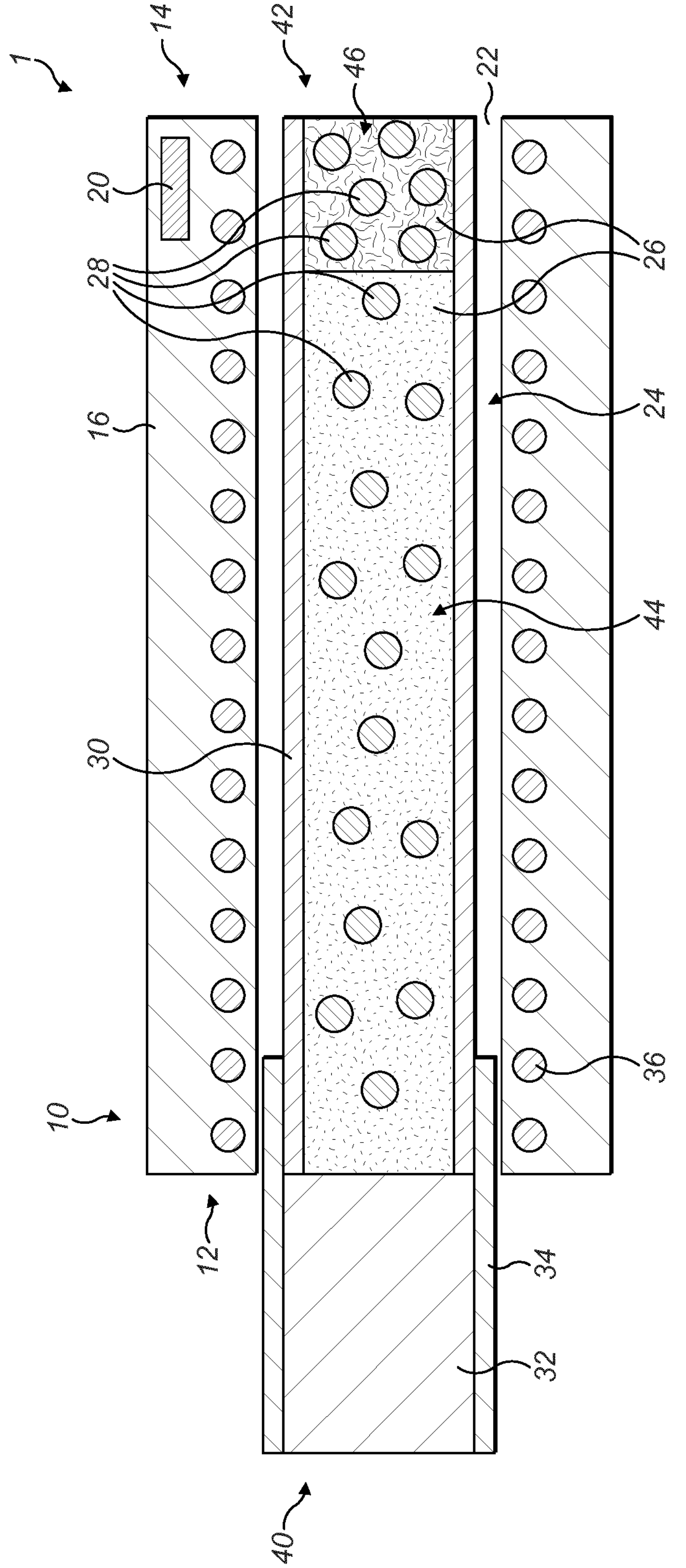
FIG. 1 is diagrammatic cross-sectional view of an inhalation system comprising a first example of a vapour generating article.

Referring initially to FIG. 1, there is shown diagrammatically an example of an inhalation system 1. The inhalation system 1 comprises an inhalation device 10 and a first example of a vapour generating article 24. The inhalation device 10 has a proximal end 12 and a distal end 14 and comprises a device body 16 which includes a power source (not shown) and a controller 20 which may be configured to operate at high frequency. The power source typically comprises one or more batteries which could, for example, be inductively rechargeable.

The inhalation device 10 is generally cylindrical and comprises a generally cylindrical vapour generating space 22, for example in the form of a heating compartment. The cylindrical vapour generating space 22 is arranged to receive a correspondingly shaped generally cylindrical or rod-shaped vapour generating article 24 containing a vapour generating material 26 and a heating element in the form of a particulate induction heatable susceptor material 28. The inhalation device 10 comprises a helical induction coil 36 which has a circular cross-section and which extends around the cylindrical vapour generating space 22. The induction coil 36 can be energised by the power source and controller 20. The controller 20 includes, amongst other electronic components, an inverter which is arranged to convert a direct current from the power source into an alternating high-frequency current for the induction coil 36.

The vapour generating article 24 is a disposable article which may, for example, contain tobacco as the vapour generating material 26. The vapour generating article 24 comprises a paper wrapper 30 surrounding the vapour generating material 26 and the particulate susceptor material 28 and has first and second ends 40, 42. The vapour generating article 24 comprises a filter 32 at the first end 40 which is in abutting coaxial alignment with the paper wrapper 30. The filter 32 acts as a mouthpiece and comprises an air-permeable plug, for example comprising cellulose acetate fibres. Both the paper wrapper 30 and the filter 32 are overwrapped by an outer wrapper 34 typically comprising tipping paper.

The vapour generating article 24 has first and second regions 44, 46 which are arranged along the longitudinal direction of the vapour generating article 24. The first and second regions 44, 46 contain different densities of the vapour generating material 26, with the second region 46 containing a higher density of the vapour generating material 26 than the first region 44 as shown diagrammatically in FIG. 1. Alternatively or in addition, the vapour generating material 26 in the second region 46 can have a higher moisture content and/or a higher aerosol-former content than the vapour generating material 26 in the first region 44. In the illustrated first example of the vapour generating article 24, the second region 46 containing the higher density of the vapour generating material 26 is positioned at the second end 42, with the first region 40 containing the lower density of the vapour generating material 26 being positioned between the filter 32 and the second region 46. Such an arrangement is advantageous because the higher density of the vapour generating material 26 in the second region 46 at the second end 42 prevents fall-out of the lower density of the vapour generating material 26 from the first region 44.

In the illustrated first example of the vapour generating article 24, a higher density of the particulate susceptor material 28 is provided in the second region 46 than in the first region 44. With this arrangement, the same type of particulate susceptor material 28 can be used in the first and second regions 44, 46, whilst the higher density of the particulate susceptor material 28 in the second region 46 generates more heat in the second region 46 than the lower density of the particulate susceptor material 28 in the first region 44.

As will be understood by one of ordinary skill in the art, when the induction coil 36 is energised during use of the inhalation system 1, an alternating and time-varying electromagnetic field is produced. This couples with the particulate susceptor material 28 in both the first and second regions 44, 46 and generates eddy currents and/or magnetic hysteresis losses in the particulate susceptor material 28 causing it to heat up.

The heat is transferred from the particulate susceptor material 28 to the vapour generating material 26 in the first and second regions 44, 46, for example by conduction, radiation and convection. As noted above, more heat is generated in the second region 46 than in the first region 44 due to the higher density of the particulate susceptor material 28 in the second region 46.

The particulate susceptor material 28 can be in direct or indirect contact with the vapour generating material 26, such that when the particulate susceptor material 28 in the first and second regions 44, 46 is inductively heated by the induction coil 36, heat is transferred from the particulate susceptor material 28 to the vapour generating material 26 in the first and second regions 44, 46, to heat the vapour generating material 26 and thereby produce a vapour or aerosol. The vaporisation of the vapour generating material 26 is facilitated by the addition of air from the surrounding environment. The vapour generated by heating the vapour generating material 26 exits the vapour generating article 24 through the filter 32 where it can be inhaled by a user of the device 10.

Figure 2:
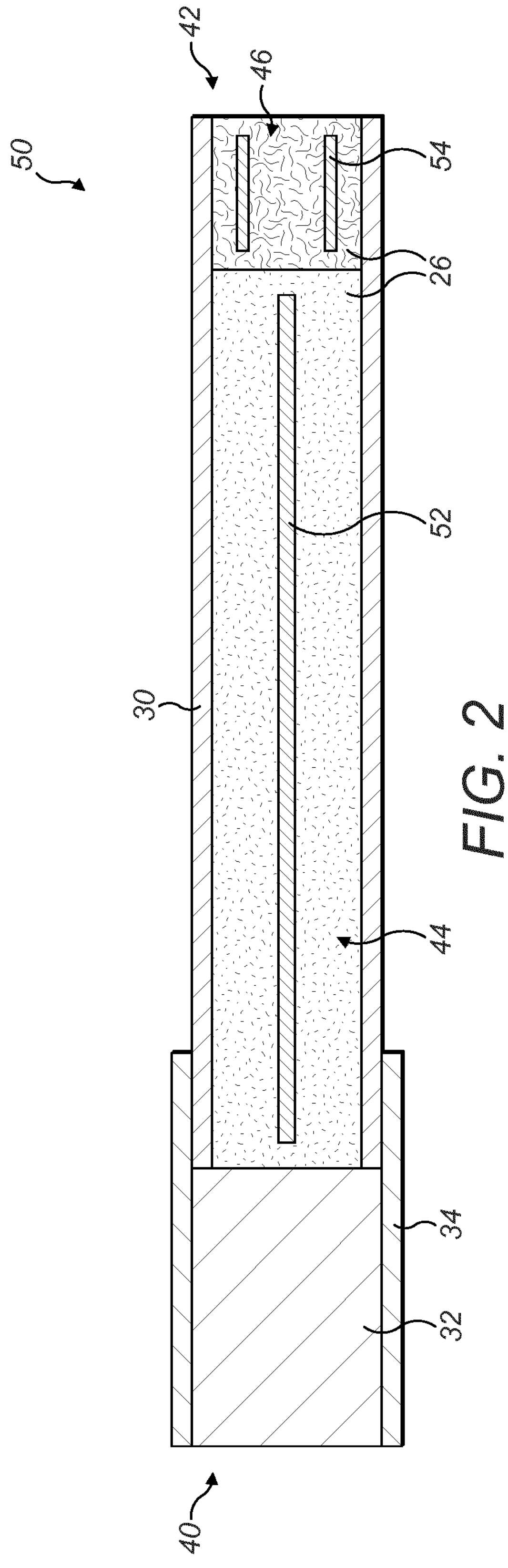
FIG. 2 is a diagrammatic cross-sectional view of a second example of a vapour generating article.

Referring now to FIG. 2, there is shown a second example of a vapour generating article 50 which is similar to the first example of the vapour generating article 24 described above with reference to FIG. 1 and in which corresponding components are identified using the same reference numerals.

The vapour generating article 50 comprises a first type of induction heatable susceptor element 52 in the first region 44 and a second type of induction heatable susceptor element 54 in the second region 46. More specifically, the first type of susceptor element 52 comprises an elongate susceptor element in the form of a bar or rod which extends in the longitudinal direction through the first region 44. In contrast, the second type of susceptor element 54 comprises a tubular susceptor with the vapour generating material 26 positioned both inside and around the tubular susceptor. With this arrangement, the tubular susceptor (i.e. the second type of susceptor element 54) generates more heat per unit time and/or generates heat for a longer period of time in the second region 46 than the elongate susceptor (i.e. the first type of susceptor element 52) in the first region 44 when the first and second types of susceptor element 52, 54 are exposed to the same electromagnetic field generated by the induction coil 36 of the inhalation device 10. Thus, more heat is generated in the second region 46 than in the first region 44.

Figure 3:
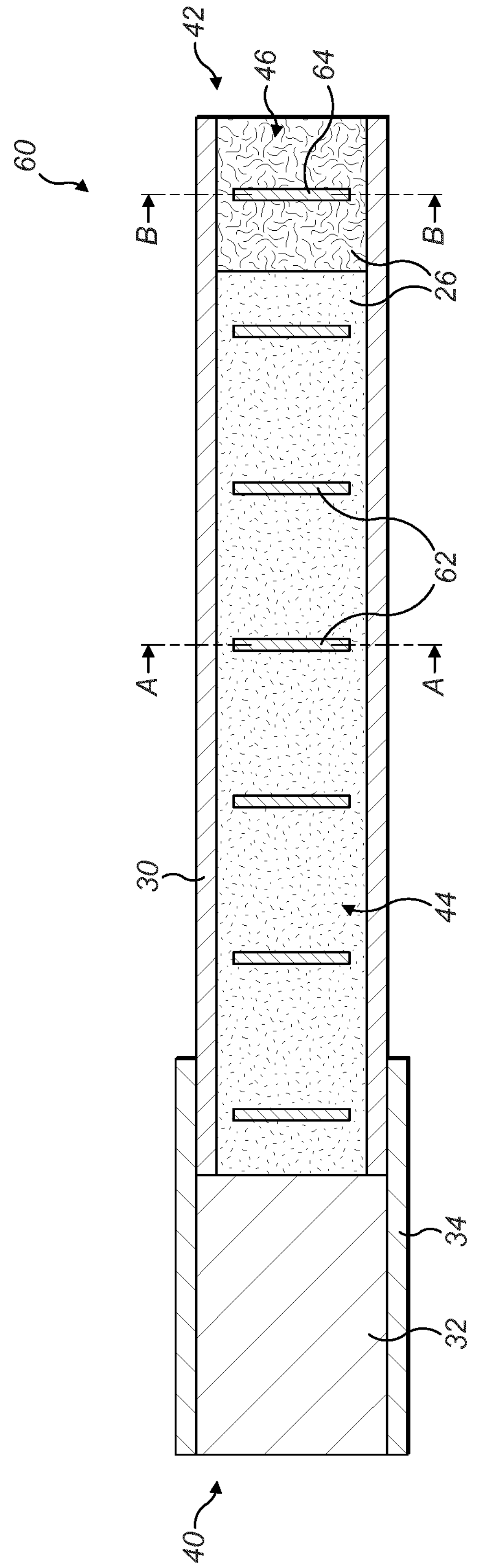
FIG. 3 is a diagrammatic cross-sectional view of a third example of a vapour generating article.

Referring now to FIGS. 3 to 5, there is shown a third example of a vapour generating article 60 which is similar to the first and second examples of the vapour generating article 24, 50 described above with reference to FIGS. 1 and 2 and in which corresponding components are identified using the same reference numerals.

The vapour generating article 60 comprises a plurality of a first type of induction heatable susceptor element 62 in the first region 44 and a second type of induction heatable susceptor element 64 in the second region 46.

Figure 4A:
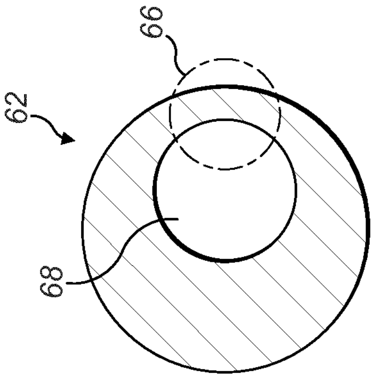
FIGS. 4*a* to 4*c* are diagrammatic views along the line A-A in FIG. 3 of examples of a first type of susceptor element.
Figure 4B:
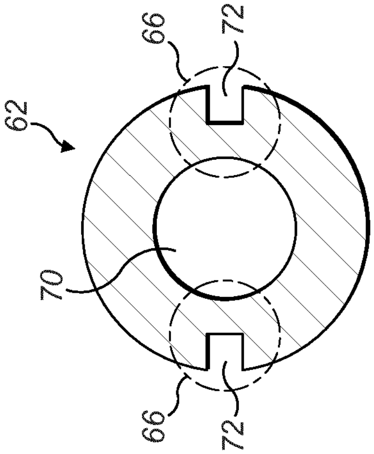
Figure 4C:
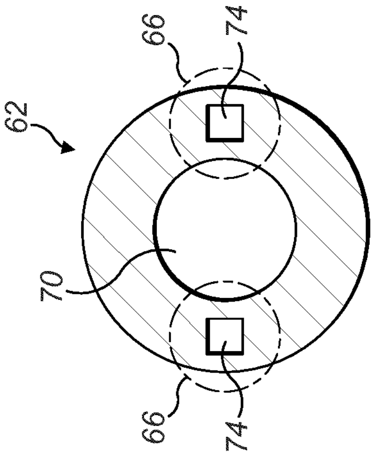

In more detail and referring to FIGS. 4*a* to 4*c* which are diagrammatic views along the line A-A in FIG. 3 of different examples of the first type of susceptor element 62, it will be seen that the first type of susceptor element 62 has at least one weakened part 66 which has a higher electrical resistance than other parts of the first type of susceptor element 62. The weakened part 66 is created by providing a part of the first type of susceptor element 62 with a smaller cross-sectional area in a plane perpendicular to the current flow direction than other parts of the first type of susceptor element 62. The higher electrical resistance of the weakened part 66 can be exploited to cause breakage of the first type of susceptor element 62, and hence breakage of its electrical path, before any breakage of the second type of susceptor element 64 occurs thereby ensuring that more heat is generated in the second region 46 than in the first region 44.

In the example shown in FIG. 4*a*, the first type of susceptor element 62 is a ring-shaped susceptor and includes a non-concentric aperture 68 thereby creating the weakened part 66 of smaller cross-sectional area. In the example shown in FIG. 4*b*, the first type of susceptor element 62 is a ring-shaped susceptor with a concentric aperture 70 and includes a pair of slits 72 at diametrically opposite positions creating two weakened parts 66 of smaller cross-sectional area. In a variation of this example, a single slit 72 or more than two slits 72 could be provided. In the example shown in FIG. 4*c*, the first type of susceptor element 62 is a ring-shaped susceptor with a concentric aperture 70 and includes a pair of openings 74 at diametrically opposite positions creating two weakened parts 66 of smaller cross-sectional area. In a variation of this example, a single opening 74 or more than two openings 74 could be provided.

Figure 5A:
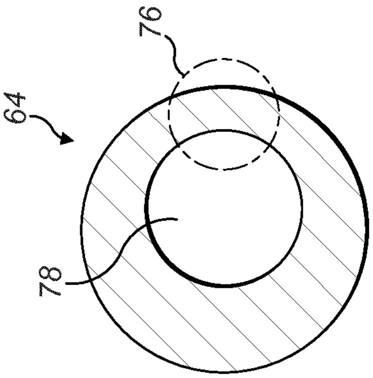
FIGS. 5*a* and 5*b* are diagrammatic views along the line B-B in FIG. 3 of examples of a second type of susceptor element.

In order to ensure that breakage of the first type of susceptor element 62 occurs before breakage of the second type of susceptor element 64, the second type of susceptor element 64 can have a weakened part 76 which is stronger than the weakened part 66 of the first type of susceptor element 62. An example of a second type of susceptor element 64 with a weakened part 76 is shown in FIG. 5*a*. The second type of susceptor element 64 is a ring-shaped susceptor and includes a non-concentric aperture 78 thereby creating the weakened part 76 of smaller cross-sectional area. It will be understood that the second type of susceptor element 64 shown in FIG. 5*a* is similar to the first type of susceptor element 62 shown in FIG. 4*a*, except that the weakened part 76 is stronger than the weakened part 66 because the weakened part 76 has a greater cross-sectional area than the weakened part 66 with the other dimensions of the first and second types of susceptor element 62, 64 being the same.

Figure 5B:
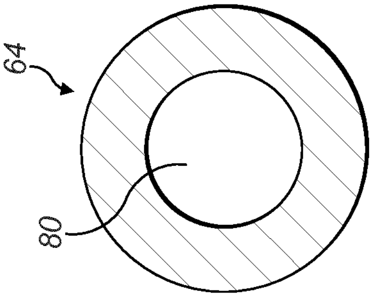

As an alternative, and in order to ensure that breakage of the first type of susceptor element 62 occurs before breakage of the second type of susceptor element 64, the second type of susceptor element 64 can be as shown in FIG. 5*b*. In this example, the second type of susceptor element 64 is a ring-shaped susceptor with a concentric aperture 80 and does not have a weakened part.

Figure 6A:
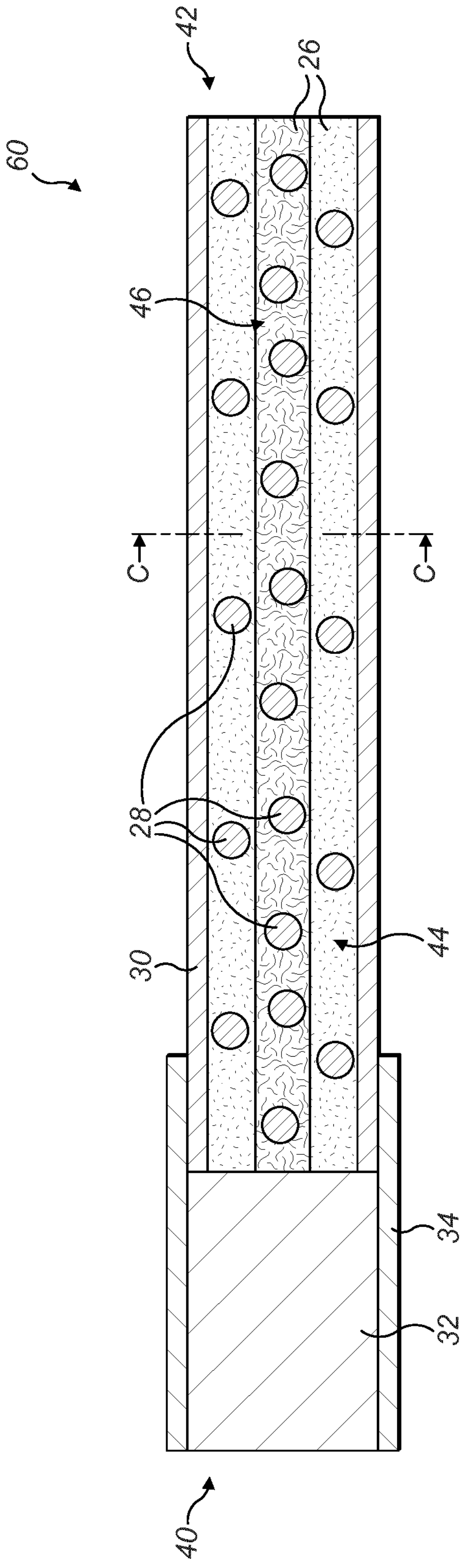
FIGS. 6*a* is a diagrammatic cross-sectional view of a fourth example of a vapour generating article.
Figure 6B:
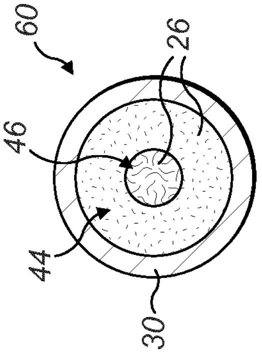
FIG. 6*b* is a diagrammatic view along the line C-C in FIG. 6*a*.

Referring now to FIG. 6, there is shown a fourth example of a vapour generating article 90 which is similar to the first example of the vapour generating article 24 described above with reference to FIG. 1 and in which corresponding components are identified using the same reference numerals.

The vapour generating article 90 has an axis extending between the first and second ends 40, 42 of the article 90 and the first and second regions 44, 46 are arranged along a radial direction with respect to the axis. In the illustrated example, the first region 44 containing the lower density of the vapour generating material 26 is arranged radially outwardly of the second region 46 containing the higher density of the vapour generating material 26. Thus, the first region 44 is an annular region which surrounds the second region 46. In an alternative example (not shown), the second region 46 containing the higher density of the vapour generating material 26 could be arranged radially outwardly of the first region 44 containing the lower density of the vapour generating material 26. In this alternative example, the second region 46 would be an annular region which surrounds the first region 44.

Like the first example of the vapour generating article 24 described above with reference to FIG. 1, the fourth example of the vapour generating article 90 employs a particulate susceptor material 28 as the heating element and contains a higher density of the particulate susceptor material 28 in the second region 46 than in the first region 44. With this arrangement, the same type of particulate susceptor material 28 can be used in the first and second regions 44, 46 whilst the higher density of the particulate susceptor material 28 in the second region 46 generates more heat in the second region 46 than the lower density of the particulate susceptor material 28 in the first region 44. It will, of course, be understood by one of ordinary skill in the art that the same type of particulate susceptor material 28 does not necessarily need to be employed in the first and second regions 44, 46 and that a first type of susceptor element (e.g. a first type of particulate susceptor) could be provided in the first region 44 and a second type of susceptor element (e.g. a second type of particulate susceptor) could be provided in the second region 46.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An inhalation system for generating a vapour for inhalation by a user, the inhalation system comprising:

an inhalation device including a controller; and a vapour generating article comprising a vapour generating material and a heating element, the heating element comprising an inductively heatable susceptor;

wherein the vapour generating article has first and second regions, the second region contains one or more of a higher density of the vapour generating material than the first region, vapour generating material with a higher moisture content than the first region, or vapour generating material with a higher aerosol-former content than the first region, and the heating element is arranged to generate more heat in the second region than in the first region, and wherein the inductively heatable susceptor comprises a first type of susceptor element in the first region and a second type of susceptor element in the second region, and the first type of susceptor element is arranged to be broken to thereby break its electrical path before the second type of susceptor element when the first and second types of susceptor element are exposed, in use, to the same electromagnetic field.

2. The inhalation system according to claim 1, wherein the vapour generating article comprises a wrapper surrounding the vapour generating material and is generally rod-shaped with first and second ends, and wherein a filter is positioned at the first end and the second region is positioned at the second end.

3. The inhalation system according to claim 1, wherein the second type of susceptor element generates more heat per unit time than the first type of susceptor element when the first and second types of susceptor element are exposed, in use, to the same electromagnetic field.

4. The inhalation system according to claim 1, wherein the second type of susceptor element generates heat for a longer period of time than the first type of susceptor element when the first and second types of susceptor element are exposed, in use, to the same electromagnetic field.

5. The inhalation system according to claim 1, wherein the inductively heatable susceptor comprises a ring-shaped susceptor.

6. The inhalation system according to claim 1, wherein the inductively heatable susceptor includes a non-concentric aperture.

7. The inhalation system according to claim 1, wherein the inductively heatable susceptor includes a slit.

8. The inhalation system according to claim 1, wherein the vapour generating article has a longitudinal direction and the first and second regions are arranged along the longitudinal direction.

9. The inhalation system according to claim 1, wherein the vapour generating article has an axis and the first and second regions are arranged along a radial direction with respect to the axis.

10. The inhalation system according to claim 1, wherein:

the first type of susceptor element has a weakened part having a higher electrical resistance than other parts of the first type of susceptor element; and either:

the second type of susceptor element has a weakened part having a higher electrical resistance than other parts of the second type of susceptor element and the weakened part of the second type of susceptor element is stronger than the weakened part of the first type of susceptor element; or the second type of susceptor element does not have a weakened part.

11. The inhalation system according to claim 10, wherein the weakened part has a smaller cross-sectional area than other parts of the susceptor element(s).

12. A vapour generating article comprising a vapour generating material and a heating element, the heating element comprising an inductively heatable susceptor, wherein the vapour generating article has first and second regions, the second region contains one or more of a higher density of the vapour generating material than the first region, vapour generating material with a higher moisture content than the first region, or vapour generating material with a higher aerosol- former content than the first region, and the heating element is arranged to generate more heat in the second region than in the first region when the vapour generating article is positioned in an inhalation device, and wherein the inductively heatable susceptor comprises a first type of susceptor element in the first region and a second type of susceptor element in the second region, and the first type of susceptor element is arranged to be broken to thereby break its electrical path before the second type of susceptor element when the first and second types of susceptor element are exposed, in use, to the same electromagnetic field.

* * * * *